A. DES ROCHER.
CONDENSATION RETURN FOR VACUUM HEATING SYSTEMS.
APPLICATION FILED JUNE 2, 1917.
1,299,142. Patented Apr. 1, 1919.
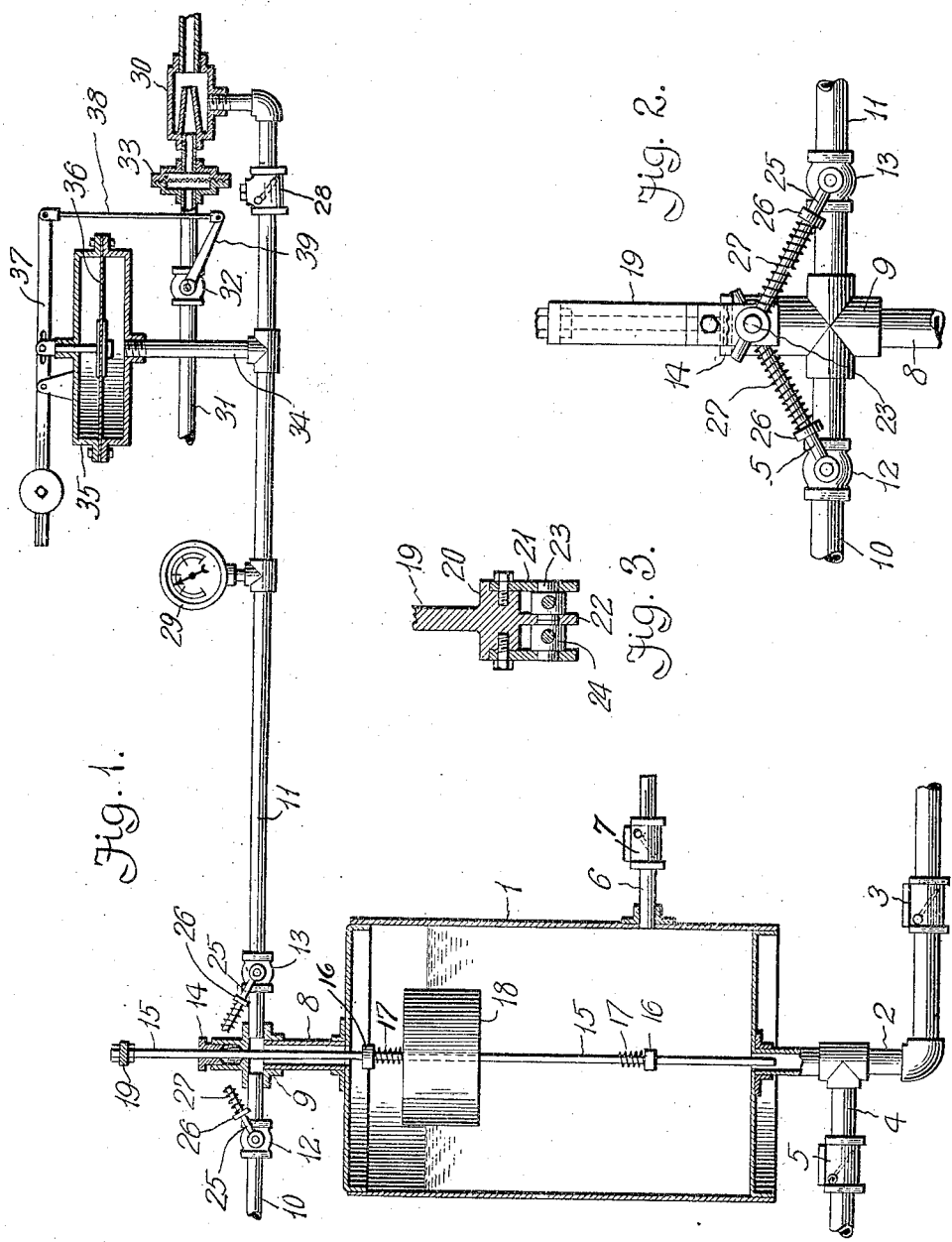

UNITED STATES PATENT OFFICE.

ALEXANDER DES ROCHER, OF DETROIT, MICHIGAN.

CONDENSATION-RETURN FOR VACUUM HEATING SYSTEMS.

1,299,142.  Specification of Letters Patent.  Patented Apr. 1, 1919.

Application filed June 2, 1917. Serial No. 172,390.

*To all whom it may concern:*

Be it known that I, ALEXANDER DES ROCHER, a citizen of the United States of America, residing at Detroit, in the county of Wayne and State of Michigan, have invented certain new and useful Improvements in Condensation-Returns for Vacuum Heating Systems, of which the following is a specification, reference being had therein to the accompanying drawings.

This invention relates to condensation returns for vacuum heating systems, and the object of my invention is to combine devices into a novel apparatus for removing the condensate and trapped air from a heating system, thus insuring a better circulation of steam in radiators or other conduits of heating devices.

The apparatus will be hereinafter specifically described and then claimed, and reference will now be had to the drawings, wherein—

Figure 1 is a an elevation of the apparatus, partly in section,

Fig. 2 is an enlarged elevation of a valve operating mechanism, and

Fig. 3 is a detail sectional view of the same.

In the drawings, the reference numeral 1 denotes a tank or reservoir having the bottom thereof provided with a pipe 2 adapted to extend to a boiler and this pipe has a conventional form of check valve 3. Tapped into the pipe 2, below the tank 1 is a condensate pipe 4, having an ordinary check valve 5.

The side of the tank 1 has an air pipe 6 provided with a check valve 7 and the top of the tank has a stand pipe 8 vertically alining with the pipe 2 at the bottom of the tank. The standpipe 8 has a four-way or cross connection 9 to which is connected a steam pipe 10 and an air pipe 11, said pipes having valves 12 and 13 adapted to be alternately opened and closed.

The connection 9 has a stuffing box 14 at the top thereof and extending through said stuffing box, the standpipe 8 and through the tank 1 into the pipe 2 is a vertically disposed float rod 15. The rod 15 is provided with stops 16 having springs 17 and a float 18 slidable on the rod 15 between the springs 17. The upper end of the rod 15 is provided with a depending bracket 19 having a cross head 20 and detachable side plates 21. The detachable side plates 21 coöperate with a central web 22 of the head 20 in supporting the trunnions 23 of bearings 24 and slidable in said bearings are valve rods 25 carried by the valve stems of the valves 12 and 13. The valve rods 25 have heads or stops 26 and compression springs 27 encircling said valve rods between the bearings 24 and the heads or stops 26, so that when the bracket 19 is raised or lowered, the valves 12 and 13 will be quickly actuated, there being a snap action after the valve rods have passed, in either direction, out of a horizontal plane. The valve stems or plugs in these valves are arranged so that when the valve 12 is open the valve 13 well be closed and vice versa.

The air pipe 11 has a suitable check valve 28 and a gage 29, said pipe being connected to an ejector 30. The ejector is of a conventional form for producing a partial vacuum in the pipe 11 and said ejector is operated by a suitable supply of water under pressure conveyed to the ejector by a water supply pipe 31 having a valve 32 and a strainer 33.

The pipe 11 has a branch 34 connected to a diaphragm casing 35 and the diaphragm 36 within the casing 35 is connected to a fulcrumed balanced lever 37 above the diaphragm casing 35. The lever 37 is connected by a link 38 to the operating lever or crank 39 of the valve 32.

Assuming that the pipe 4 receives condensate from the radiators of a heating system and that the pipe 6 is connected to such a system so as to remove pocketed or trapped air therefrom, the condensate will accumulate in the tank 1, and when the float 18 is sufficiently elevated the valve 12 is open and the valve 13 closed. As the steam, under pressure enters the top of the tank 1 to the standpipe 8, the condensate within the tank is forced out through the pipe 2 and returned to the boiler. While this is taking place, the float 18 is gradually lowered and eventually the valve 12 is closed and the valve 13 opened. By this time the pipe 6 communicates with the pipe 11 through the tank 1 and the standpipe 8 and the air entering the diaphragm casing 35 flexes the diaphragm 36 and through the medium of the lever 37, link 38 and lever 39, the valve 32 is opened to admit water or similar fluid to the ejector 30. When the ejector is placed in operation, the air from the pipe 6, tank 1, and pipe 11, is withdrawn, thus getting rid of condensate and air of a heating system.

It is thought that the operation and utility of the apparatus will be apparent without further description, and while in the drawing there is illustrated a preferred embodiment of the same, it is to be understood that the structural elements are susceptible to rearrangement and such changes as fall within the scope of the appended claims.

What I claim is:—

1. In a heating system, a tank adapted to receive condensate from the system and return the condensate to a boiler, air and steam pipes communicating with said tank so that steam may be supplied to said tank for driving the condensate therein to a boiler, an ejector in connection with the air pipe adapted for removing air from said tank, valves in connection with the steam and air pipes, and a float mechanism in said tank adapted for simultaneously actuating said valves, so as to alternately place said steam and air pipes in communication with said tank.

2. In a condensation return apparatus for vacuum heating systems, a tank adapted to receive condensate and air from the heating system and return the condensate to a boiler, a steam pipe communicating with said tank, an air pipe communicating with said tank, a fluid pressure operated ejector in connection with said air pipe for withdrawing air from said tank, a diaphragm actuated by air from said air pipe for controlling the operation of said ejector, valves in connection with said steam and air pipes, a float mechanism in said tank adapted for simultaneously operating said valves to alternately open and close said valves.

In testimony whereof I affix my signature in presence of two witnesses.

ALEXANDER DES ROCHER.

Witnesses:
KARL H. BUTLER,
ANNA M. DORR.

Copies of this patent may be obtained for five cents each, by addressing the "Commissioner of Patents, Washington, D. C."